US009495014B2

United States Patent
Matsuo

(10) Patent No.: US 9,495,014 B2
(45) Date of Patent: Nov. 15, 2016

(54) PORTABLE PLAYBACK DEVICE, AND CONTROL METHOD FOR PORTABLE PLAYBACK DEVICE, PROGRAM, AND INFORMATION STORAGE MEDIUM CAPABLE OF FACILITATING AN OPERATION FOR CHANGING A REPRODUCTION OF CONTENT DATA

(75) Inventor: Keisuke Matsuo, Kanagawa (JP)

(73) Assignee: RAKUTEN, INC., Tokyo (JP)

( * ) Notice: Subject to any disclaimer, the term of this patent is extended or adjusted under 35 U.S.C. 154(b) by 273 days.

(21) Appl. No.: 14/241,896

(22) PCT Filed: Apr. 10, 2012

(86) PCT No.: PCT/JP2012/059800
§ 371 (c)(1),
(2), (4) Date: May 19, 2014

(87) PCT Pub. No.: WO2013/031282
PCT Pub. Date: Mar. 7, 2013

(65) Prior Publication Data
US 2014/0282284 A1    Sep. 18, 2014

(30) Foreign Application Priority Data

Aug. 31, 2011  (JP) .................................. 2011-190085

(51) Int. Cl.
*G06F 3/01* (2006.01)
*H04M 1/725* (2006.01)
(Continued)

(52) U.S. Cl.
CPC ............. *G06F 3/017* (2013.01); *G11B 27/105* (2013.01); *G11B 27/34* (2013.01); *H04M 1/72558* (2013.01); *H04M 2250/12* (2013.01)

(58) Field of Classification Search
CPC ................ G06F 17/30884; G06F 3/017; G06F 3/0483; G06F 3/0346; G06F 3/0484; G06F 17/241
See application file for complete search history.

(56) References Cited

U.S. PATENT DOCUMENTS 7,289,102 B2 * 10/2007 Hinckley ............... G06F 1/1626
345/156
7,519,468 B2 * 4/2009 Orr ........................ G01C 21/36
340/990

(Continued)

FOREIGN PATENT DOCUMENTS

JP          09-069023 A      3/1997
JP       2005-221816 A      8/2005

(Continued)

OTHER PUBLICATIONS

International Search Report for PCT/JP2012/059800 dated Jul. 17, 2012.

(Continued)

*Primary Examiner* — Maryam Ipakchi
(74) *Attorney, Agent, or Firm* — Hubbs, Enatsky & Inoue PLLC

(57) ABSTRACT

In a case where an inclination state of the portable reproduction device is changed from a reference state to another state in which a difference from the reference state in inclination is equal to or larger than a reference value and thereafter returns from the other state to the reference state, a determination unit determines whether or not the period of time elapsed after the inclination state starts changing from the reference state to the other state until the inclination state returns to the reference state is within a reference period of time. In a case where the determination unit determines that the period of time elapsed is within the reference period of time, a production control unit changes the reproduction (Continued)

position of the content data, based on a direction of inclination of the portable reproduction device in the other state relative to the reference state.

17 Claims, 7 Drawing Sheets

(51) Int. Cl.
*G11B 27/10* (2006.01)
*G11B 27/34* (2006.01)

(56) References Cited

U.S. PATENT DOCUMENTS

| | | | | |
|---|---|---|---|---|
| 7,859,516 B2* | 12/2010 | Hanyu | ............... | G06F 3/0485 345/158 |
| 7,978,176 B2* | 7/2011 | Forstall | ............... | G06F 1/1626 345/158 |
| 8,081,164 B2* | 12/2011 | Badali | ............... | G06F 1/1626 345/156 |
| 8,228,292 B1* | 7/2012 | Ruiz | ............... | G06F 1/1626 345/156 |
| 8,902,181 B2* | 12/2014 | Hinckley | ............... | G06F 3/0487 345/173 |
| 2004/0236774 A1* | 11/2004 | Baird | ............... | G06F 17/241 |
| 2006/0017692 A1* | 1/2006 | Wehrenberg | ............... | G06F 1/1616 345/156 |
| 2007/0164993 A1* | 7/2007 | Kao | ............... | G06F 1/1626 345/156 |
| 2007/0180409 A1* | 8/2007 | Sohn | ............... | G06F 1/1694 715/863 |
| 2007/0188450 A1* | 8/2007 | Hernandez | ............... | G06F 1/1626 345/158 |
| 2007/0290999 A1* | 12/2007 | Cho | ............... | G06F 1/1626 345/158 |
| 2008/0211685 A1* | 9/2008 | Grady | ............... | G06F 1/1613 340/689 |
| 2008/0259057 A1* | 10/2008 | Brons | ............... | G06F 1/1626 345/184 |
| 2009/0197635 A1* | 8/2009 | Kim | ............... | G06F 3/0346 455/550.1 |
| 2010/0188328 A1* | 7/2010 | Dodge | ............... | G06F 3/0346 345/156 |
| 2010/0295790 A1* | 11/2010 | Yu | ............... | G06F 1/1626 345/168 |
| 2011/0050591 A1* | 3/2011 | Kim | ............... | G06F 3/0488 345/173 |
| 2011/0057880 A1* | 3/2011 | Kasahara | ............... | G06F 1/1626 345/158 |
| 2011/0298762 A1* | 12/2011 | Lin | ............... | G06F 1/1652 345/204 |
| 2012/0032877 A1* | 2/2012 | Watkins, Jr. | ............... | G06F 1/1624 345/156 |
| 2012/0154294 A1* | 6/2012 | Hinckley | ............... | G06F 1/1649 345/173 |
| 2012/0209841 A1* | 8/2012 | Saretto | ............... | G06F 17/218 707/736 |
| 2012/0311438 A1* | 12/2012 | Cranfill | ............... | G06F 17/30011 715/256 |
| 2013/0298067 A1* | 11/2013 | Parker | ............... | G06F 3/0483 715/776 |

FOREIGN PATENT DOCUMENTS

| | | |
|---|---|---|
| JP | 2007-280461 A | 10/2007 |
| JP | 2010-103919 A | 5/2010 |

OTHER PUBLICATIONS

Written Opinion of the International Searching Authority for PCT/JP2012/059800 dated Jul. 17, 2012.

\* cited by examiner

FIG. 7

| HOLDING STATE | 0 |
|---|---|

FIG. 8

| ID | BOOKMARK |
|---|---|
| 00001 | — — — |
| 00005 | — — — |
| 00012 | — — — |
| ... | ... |

FIG. 9

| HOLDING STATE | INCLINATION DIRECTION OF PORTABLE REPRODUCTION DEVICE | | CONTROL CONTENT |
|---|---|---|---|
| 0 | α | POSITIVE DIRECTION | REGISTER CURRENT PAGE IN BOOKMARK DATA (DELETE CURRENT PAGE FROM BOOKMARK DATA) |
| | | NEGATIVE DIRECTION | — |
| | β | POSITIVE DIRECTION | — |
| | | NEGATIVE DIRECTION | — |
| | γ | POSITIVE DIRECTION | ADVANCE TO NEXT PAGE |
| | | NEGATIVE DIRECTION | REGRESS TO PREVIOUS PAGE |
| 1 | α | POSITIVE DIRECTION | ADVANCE TO NEXT PAGE |
| | | NEGATIVE DIRECTION | REGRESS TO PREVIOUS PAGE |
| | β | POSITIVE DIRECTION | — |
| | | NEGATIVE DIRECTION | — |
| | γ | POSITIVE DIRECTION | REGISTER CURRENT PAGE IN BOOKMARK DATA (DELETE CURRENT PAGE FROM BOOKMARK DATA) |
| | | NEGATIVE DIRECTION | — |

FIG.10

| HOLDING STATE | INCLINATION DIRECTION OF PORTABLE REPRODUCTION DEVICE | | CONTROL CONTENT |
|---|---|---|---|
| 0 | α | POSITIVE DIRECTION | — |
| | | NEGATIVE DIRECTION | — |
| | β | POSITIVE DIRECTION | — |
| | | NEGATIVE DIRECTION | — |
| | γ | POSITIVE DIRECTION | TURN OVER PAGES TOWARD LAST PAGE |
| | | NEGATIVE DIRECTION | TURN OVER PAGES TOWARD INITIAL PAGE |
| 1 | α | POSITIVE DIRECTION | TURN OVER PAGES TOWARD LAST PAGE |
| | | NEGATIVE DIRECTION | TURN OVER PAGES TOWARD INITIAL PAGE |
| | β | POSITIVE DIRECTION | — |
| | | NEGATIVE DIRECTION | — |
| | γ | POSITIVE DIRECTION | — |
| | | NEGATIVE DIRECTION | — |

FIG.11

| INCLINATION DEGREE ($\theta$) | SPEED INFORMATION |
|---|---|
| $\theta_1 < \theta \leq \theta_2$ | V1 |
| $\theta_2 < \theta \leq \theta_3$ | V2 |
| $\theta_3 < \theta$ | V3 |

PORTABLE PLAYBACK DEVICE, AND CONTROL METHOD FOR PORTABLE PLAYBACK DEVICE, PROGRAM, AND INFORMATION STORAGE MEDIUM CAPABLE OF FACILITATING AN OPERATION FOR CHANGING A REPRODUCTION OF CONTENT DATA

CROSS REFERENCE TO RELATED APPLICATIONS

This application is a National Stage of International Application No. PCT/JP2012/059800 filed Apr. 10, 2012, claiming priority based on Japanese Patent Application No. 2011-190085 filed on Aug. 31, 2011. The contents of each of the above documents are incorporated herein by reference in their entirety.

TECHNICAL FIELD

The present invention relates to a portable reproduction device, a control method for a portable reproduction device, a program, and an information storage medium.

BACKGROUND ART

There has been known a portable information terminal having a detection unit for detecting a position in a screen designated by a user. For example, a tablet computer or the like having a touch panel has been known. Flick operation, touch operation, and the like, have been known as an operation performed on a touch panel of such a portable information terminal, for example (for example, Patent Literature 1).

For example, flick operation or the like is employed as an operation on a portable information terminal described above. For example, flick operation is employed in a portable information terminal for reproducing content data as an operation for changing (advancing or regressing) a reproduction position of the content data. In a portable information terminal for displaying an electronic book, for example, flick operation is employed as an operation for turning over the pages. In a portable information terminal for reproducing music, flick operation is employed as an operation for skipping music.

CITATION LIST

Patent Literature

Patent Literature 1: JP 2010-103919 A

SUMMARY OF INVENTION

Technical Problem

In using the above described portable information terminal while holding by hand, however, a user needs to perform flick operation or the like with a finger different from the finger holding the portable information terminal. For example, in using a portable information terminal having a relatively large size, such as a tablet computer, while holding by hand, a user needs to hold the portable information terminal with one hand and perform flick operation or the like with the other hand.

With such a need, it may be difficult, depending on a situation, to perform flick operation or touch operation and, resultantly, an operation for changing a reproduction position of content data. For example, a user viewing content data reproduced on a portable information terminal while standing in a train or the like needs to hang on a strap with one hand and hold the portable information terminal with the other hand. In such a case, because their both hands are occupied, the user can hardly perform flick operation and thus an operation for changing a reproduction position of content data.

The present invention has been conceived in view of the above, and an object thereof is to provide a portable reproduction device, a control method for a portable reproduction device, a program, and an information storage medium capable of facilitating an operation by a user for changing a reproduction position of content data reproduced on a portable reproduction device.

Solution to Problem

In order to achieve the above mentioned object, a portable reproduction device according to the present invention is a portable reproduction device for reproducing content data, the portable reproduction device including inclination detection means for detecting an inclination of the portable reproduction device; determination means for determining, in the case where the inclination state of the portable reproduction device detected by the inclination detection means is changed from a reference state to another state in which a difference from the reference state in inclination is equal to or larger than a reference value and thereafter returns from the another state to the reference state, whether or not a period of time elapsed after the inclination state of the portable reproduction device starts changing from the reference state to the another state until the inclination state of the portable reproduction device returns to the reference state is within a reference period of time; and reproduction control means for changing a reproduction position of the content data, based on a direction of inclination of the portable reproduction device in the another state relative to the reference state, in the case where the determination means determines that the period of time elapsed is within the reference period of time.

Further, a control method for a portable reproduction device according to the present invention is a control method for a portable reproduction device for reproducing content data, the portable reproduction device including inclination detection means for detecting an inclination of the portable reproduction device, the control method including a step of obtaining information on the inclination of the portable reproduction device from the inclination detection means; a step of determining, in the case where the inclination state of the portable reproduction device detected by the inclination detection means is changed from a reference state to another state in which a difference from the reference state in inclination is equal to or larger than a reference value and thereafter returns from the another state to the reference state, whether or not a period of time elapsed after the inclination state of the portable reproduction device starts changing from the reference state to the another state until the inclination state of the portable reproduction device returns to the reference state is within a reference period of time; and a reproduction control step of changing a reproduction position of the content data, based on a direction of inclination of the portable reproduction device in the another state relative to the reference state, in the case where it is determined at the determination step that the period of time elapsed is within the reference period of time.

Further, a program according to the present invention is a program for causing a computer including inclination detection means for determining an inclination of the portable reproduction device, to function as a portable reproduction device for reproducing content data, the program for causing the computer to function as means for obtaining information on the inclination of the portable reproduction device from the inclination detection means; determination means for determining, in the case where the inclination state of the portable reproduction device detected by the inclination detection means is changed from a reference state to another state in which a difference from the reference state in inclination is equal to or larger than a reference value and thereafter returns from the another state to the reference state, whether or not a period of time elapsed after the inclination state of the portable reproduction device starts changing from the reference state to the another state until the inclination state of the portable reproduction device returns to the reference state is within a reference period of time; and reproduction control means for changing a reproduction position of the content data, based on a direction of inclination of the portable reproduction device in the another state relative to the reference state, in the case where the determination means determines that the period of time elapsed is within the reference period of time.

Further, an information storage medium according to the present invention is a computer readable information storage medium storing a program for causing a computer including inclination detection means for detecting an inclination of the portable reproduction device, to function as a portable reproduction device for reproducing content data, the program for causing the computer to function as means for obtaining information on the inclination of the portable reproduction device from the inclination detection means; determination means for determining, in the case where the inclination state of the portable reproduction device detected by the inclination detection means is changed from a reference state to another state in which a difference from the reference state in inclination is equal to or larger than a reference value and thereafter returns from the another state to the reference state, whether or not a period of time elapsed after the inclination state of the portable reproduction device starts changing from the reference state to the another state until the inclination state of the portable reproduction device returns to the reference state is within a reference period of time; and reproduction control means for changing a reproduction position of the content data, based on a direction of inclination of the portable reproduction device in the another state relative to the reference state, in the case where the determination means determines that the period of time elapsed is within the reference period of time.

Further, according to one aspect of the present invention, the reproduction control means may include means for setting an amount by which to change the reproduction position of the content data when changing the reproduction position of the content data, based on an inclination degree of the portable reproduction device in the another state relative to the reference state.

Further, according to one aspect of the present invention, the portable reproduction device may further includes second determination means for determining, in the case where the inclination state of the portable reproduction device detected by the inclination detection means is changed from the reference state to the another state, whether or not the period of time elapsed after the inclination state of the portable reproduction device starts changing from the reference state until the inclination state of the portable reproduction device comes to be in the another state is within a reference period of time, wherein the reproduction control means may include means for changing the reproduction position of the content data, based on a current direction of inclination of the portable reproduction device relative to the reference state, during a period after the second determination means determines that the period of time elapsed is within the reference period of time.

Further, according to one aspect of the present invention, the reproduction position of the content data may be changed at a speed correlated to a current degree of inclination of the portable reproduction device relative to the reference state, during the period after the second determination means determines that the period of time elapsed is within the reference period of time.

Further, according to one aspect of the present invention, the portable reproduction device may further include approach detection means for detecting a user approaching the portable reproduction device; and restricting means for restricting reproduction control by the reproduction control means with respect to the content data, based on a result of detection by the approach detection means.

Further, according to one aspect of the present invention, the reproduction control means may change the reproduction position of the content data, in the case where the determination means determines that the period of time elapsed is within the reference period of time, and the direction of inclination of the portable reproduction device in the another state relative to the reference state is a direction of inclination with a first axis as a rotation axis, and the portable reproduction device may include bookmark registration means for registering information indicating a current reproduction position of the content data in bookmark data stored in storage means, in the case where the determination means determines that the period of time elapsed is within the reference period of time, and the direction of inclination of the portable reproduction device in the another state relative to the reference state is a direction of inclination with a second axis orthogonal to the first axis as a rotation axis.

Further, according to one aspect of the present invention, the portable reproduction device may include means for deleting the information indicating the current reproduction position of the content data from the bookmark data, in the case where the determination means determines that the period of time elapsed is within the reference period of time, the direction of inclination of the portable reproduction device in the another state relative to the reference state is a direction of inclination with the second axis as a rotation axis, and the information indicating the current reproduction position of the content data is already registered in the bookmark data.

Further, according to one aspect of the present invention, the content data may include a plurality of unit content data, the portable reproduction device may reproduce the plurality of unit content data according to order information, and the reproduction control means may change reproduction target unit content data to unit content data following or preceding current reproduction target unit content data, to thereby change the reproduction position of the content data.

Further, according to one aspect of the present invention, the another state may be a state in which a difference from the reference state in inclination is equal to or larger than a first reference value, and the determination means may determine that the inclination state of the portable reproduction device returns to the reference state in the case where the inclination state of the portable reproduction device detected by the inclination detection means comes to be in a state in which the difference from the reference state in inclination is equal to or smaller than a second reference value that is smaller than the first reference state.

Advantageous Effects of Invention

According to the present invention, it is possible to facilitate an operation by a user for changing a reproduction position of content data reproduced on a portable reproduction device.

BRIEF DESCRIPTION OF DRAWINGS

FIG. 7 shows one example of holding state data;

FIG. 8 shows one example of bookmark data;

FIG. 9 shows one example of correlation relationship data;

FIG. 10 shows another example of the correlation relationship data;

FIG. 11 shows one example of speed data;

DESCRIPTION OF EMBODIMENTS

In the following, an example of an embodiment of the present invention will be described in detail, based on the drawings.

Figure 1:
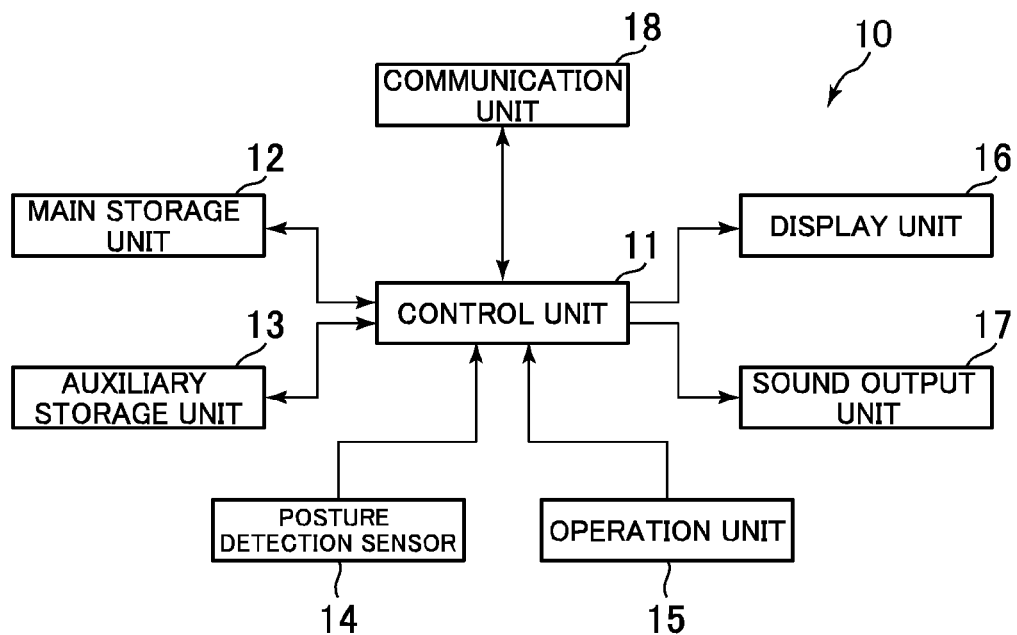
FIG. 1 shows one example of a hardware structure of a portable reproduction device according to an embodiment of the present invention.
Figure 2:
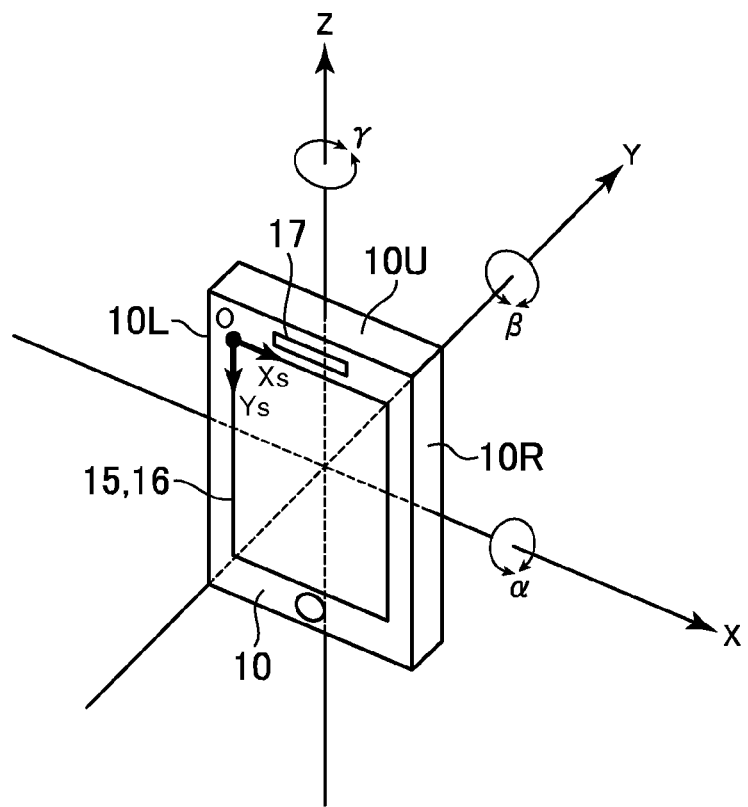
FIG. 2 shows one example of an external appearance of the portable reproduction device according to the embodiment of the present invention.

A portable reproduction device according to this embodiment is implemented using, for example, a portable information terminal, a portable phone, a portable game device, or the like. FIG. 1 shows one example of a hardware structure of a portable reproduction device 10 according to this embodiment. FIG. 2 shows one example of an external appearance of the portable reproduction device 10 according to this embodiment.

As shown in FIG. 1, the portable reproduction device 10 includes a control unit 11, a main memory unit 12, an auxiliary storage unit 13, a posture detection sensor 14, an operation unit 15, a display unit 16, a sound output unit 17, and a communication unit 18. The control unit 11 includes, for example, one or more CPUs and executes information processing according to an operation system or a program stored in the auxiliary storage unit 13. The main memory unit 12 is, for example, a RAM, and the auxiliary storage unit 13 is, for example, a hard disk or a solid state drive.

For example, a program and data are supplied via a communication network, such as the Internet, or the like, to the auxiliary storage unit 13. That is, a program and data sent from a server computer via the communication network is received by the portable reproduction device 10, and stored in the auxiliary storage unit 13. The portable reproduction device 10 may include an optical disk drive for reading a program and data stored in an optical disk (an information storage medium), and the program and data is supplied to the auxiliary storage unit 13 via the optical disk. That is, an optical disk storing a program and data may be mounted in the optical disk drive, and the program and data stored in the optical disk may be read by the optical disk drive and stored in the auxiliary storage unit 13. Alternatively, a structural element for reading a program or data stored in an information storage medium other than an optical disk (for example, a memory card) may be included instead of an optical disk drive, and the program and data may be supplied to the auxiliary storage unit 13 via an information storage medium other than an optical disk.

The posture detection sensor 14 includes one or more sensors for detecting the posture (inclination) of the portable reproduction device 10. For example, the posture detection sensor 14 includes at least one of an acceleration sensor and a gyro sensor. The description below is based on an assumption that an acceleration sensor and a gyro sensor are both built in the portable reproduction device 10.

For example, the acceleration sensor detects acceleration in three respective orthogonal axial directions (the X axial direction, the Y axial direction, and the Z axial direction). As shown in FIG. 2, the portable reproduction device 10 has a rectangular shape, in which the X axis corresponds to the shorter side direction of the portable reproduction device 10, the Z axis corresponds to the longitudinal direction of the portable reproduction device 10, and the Y axis corresponds to the depth direction of the portable reproduction device 10.

For example, the gyro sensor detects an angular speed in three respective orthogonal axes (the X axis, the Y axis, and the Z axis). That is, the gyro sensor detects a rotation amount per unit period of time when the portable reproduction device 10 is rotated with the X axial as a rotation axis. That is, the gyro sensor detects an angular speed in the α direction shown in FIG. 2. Similarly, the gyro sensor detects a rotation amount per unit period of time when the portable reproduction device 10 is rotated with the Y axis as a rotation axis. That is, the gyro sensor detects an angular speed in the β direction shown in FIG. 2. Further, the gyro sensor detects a rotation amount per unit period of time when the portable reproduction device 10 is rotated with the Z axis as a rotation axis. That is, the gyro sensor detects an angular speed in the γ direction shown in FIG. 2.

Information indicating a result of detection by the posture detection sensor 14 is supplied to the control unit 11 for every predetermined period of time (for example, $1/60^{th}$ of a second). The control unit 11 determines the posture (inclination) of the portable reproduction device 10, based on a result of detection by the posture detection sensor 14.

For example, the control unit 11 determines the posture (inclination) of the portable reproduction device 10, based on a result of detection by the acceleration sensor. For example, the control unit 11 determines the posture (inclination) of the portable reproduction device 10, based on how gravity acceleration is detected as acceleration in the X axial direction, the Y axial direction, and the Z axial direction, respectively.

Alternatively, for example, the control unit 11 determines the posture (inclination) of the portable reproduction device 10, based on a result of detection by the gyro sensor. For example, the control unit 11 integrates the angular speeds in the respective axes detected by the gyro sensor to thereby determine how much the portable reproduction device 10 is rotated with each axis as a rotation axis.

The operation unit 15 is a unit for operation by a user. In this embodiment, a designation unit on which a user designates a position in a screen displayed on the display unit 16 is provided as the operation unit 15. For example, a pointing device, such as a touch panel or the like, is provided as the operation unit 15. The following description is based on an assumption that a touch panel is provided to the portable reproduction device 10 so as to overlap the display unit 16.

The touch panel provided to the portable reproduction device 10 is a general touch panel, and detects a position touched by a user. As a touch panel, for example, an electrostatic capacitance type touch panel is used. In the electrostatic capacitance type touch panel, one or more positions touched by a user is/are detected based on change in the charge that is caused when the user touches the front surface of the touch panel. Note that another type touch panel, such as resistive film type, or the like, for example, may be used as a touch panel.

Information indicating a position touched by a user is supplied to the control unit 11 for every predetermined period of time (for example, $1/60^{th}$ of a second). A position touched by a user is expressed by means of coordinate values according to a screen coordinate system, for example. A "screen coordinate system" refers to a coordinate system in which the upper left vertex of a screen is defined as the origin O, the rightward direction as the positive direction of the Xs axis, and the downward direction as the positive direction of the Ys axis (see FIG. 2). The control unit 11 obtains the position touched by a user, based on the information supplied from the touch panel.

The display unit 16 is a liquid crystal display, or the like, for example, and the sound output unit 17 is a speaker, a headphone terminal, or the like, for example.

The communication unit 18 is a unit for use in data communication by the portable reproduction device 10 with other devices. Specifically, according to an instruction from the control unit 11, the communication unit 18 sends data to another device or supplies data received from another device to the control unit 11. If the portable reproduction device 10 has a telephone function, the communication unit 18 makes a call to another device and receives a call from another device.

The portable reproduction device 10 executes an application program for reproducing various content data. For example, any of application programs such as those mentioned below is executed.

application program for displaying (reproducing) an electronic book;
application program for reproducing music data;
application program for reproducing video data; and
application program for displaying (reproducing) image data.

In the above described portable reproduction device 10, a user interface for facilitating change by a user of a reproduction position of content data is implemented. Below, this user interface will be described. The description below refers mainly to a case as an example in which an application program for displaying an electronic book (hereinafter referred to as an "electronic book viewer") is executed.

Figure 3:
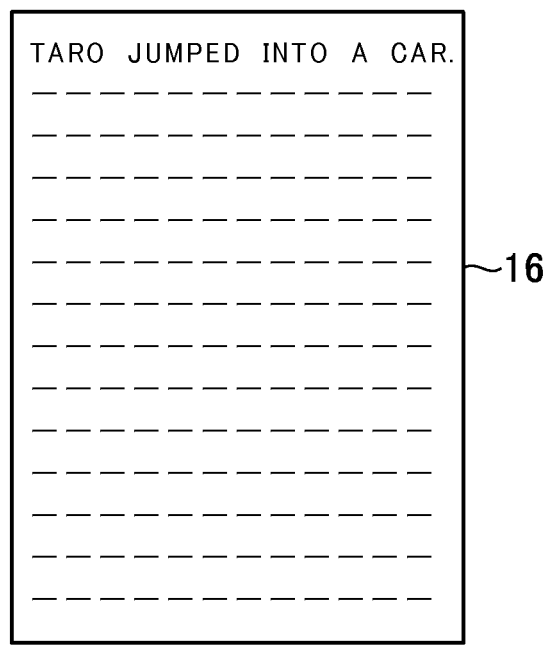
FIG. 3 shows one example of a screen displayed on a display unit.

FIG. 3 shows one example of a screen displayed on the display unit 16 when the electronic book viewer is executed. In the example shown in FIG. 3, one page of an electronic book is displayed on the screen. Alternatively, two pages, or double truck, may be displayed on the screen.

Figure 4:
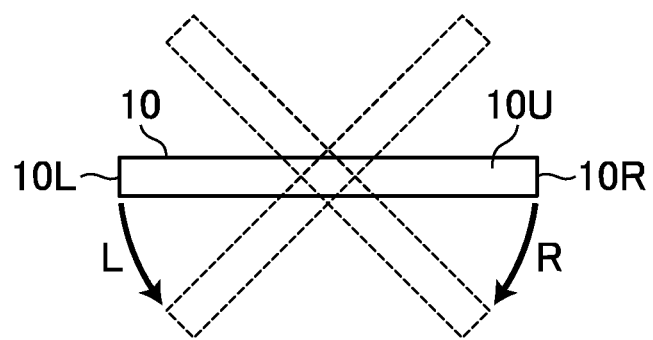
FIG. 4 explains one example of a page turning operation.

Below, an operation for turning over the pages on the electronic book viewer will be described. FIG. 4 explains a page turning operation. FIG. 4 shows the portable reproduction device 10 viewed from the upper surface 10U side.

A user can turn over the pages by changing the inclination of the portable reproduction device 10. Specifically, a user can turn over the pages by inclining the portable reproduction device 10 so as to rotate with the Z axis as a rotation axis.

For example, in order to display a previous page on the screen, a user inclines the portable reproduction device 10 for a relatively short period of time (for example, within 0.5 second), as indicated by the arrow L in FIG. 4, for example, such that the left side surface 10L thereof comes closer to the user, while the right side surface 10R thereof goes farther away from the user. That is, a user performs an operation of inclining the portable reproduction device 10, as indicated by the arrow L in FIG. 4, and instantly returning to its original state, within a relatively short period of time. With such an operation performed, the previous page is displayed on the screen.

Meanwhile, in order to display a next page on the screen, a user inclines the portable reproduction device 10 for a relatively short period of time (for example, within 0.5 second), as indicated by the arrow R in FIG. 4, for example, such that the right side surface 10R thereof comes closer to the user while the left side surface 10L thereof goes farther away from the user. That is, a user performs an operation of inclining the portable reproduction device 10, as indicated by the arrow R in FIG. 4, and instantly returning to its original state, within a relatively short period of time. With such an operation performed, the next page is displayed on the screen.

Below, an operation performed by a user in order to keep turning over the pages will be described. For example, in order to keep turning over the pages toward the initial page, a user instantly inclines the portable reproduction device 10, as indicated by the arrow L in FIG. 4, and then keeps the portable reproduction device 10 inclined. While the portable reproduction device 10 is kept inclined, the pages are kept being turned over toward the initial page.

In this case, a speed for turning over the pages is set based on the inclination degree of the portable reproduction device 10. Specifically, a larger inclination degree leads to a faster speed. Therefore, a user can designate a speed for turning over the pages by adjusting the inclination degree of the portable reproduction device 10.

Meanwhile, in order to keep turning over the pages toward the last page, a user instantly inclines the portable reproduction device 10, as indicated by the arrow R in FIG. 4, and then keeps the portable reproduction device 10 inclined. While the portable reproduction device 10 is kept inclined, the pages are kept being turned over toward the last page.

In this case as well, a speed for turning over the pages is set based on the inclination degree of the portable reproduction device 10. Specifically, a larger inclination degree leads to a faster speed. Therefore, a user can designate a speed for turning over the pages by adjusting the inclination degree of the portable reproduction device 10.

Figure 5:
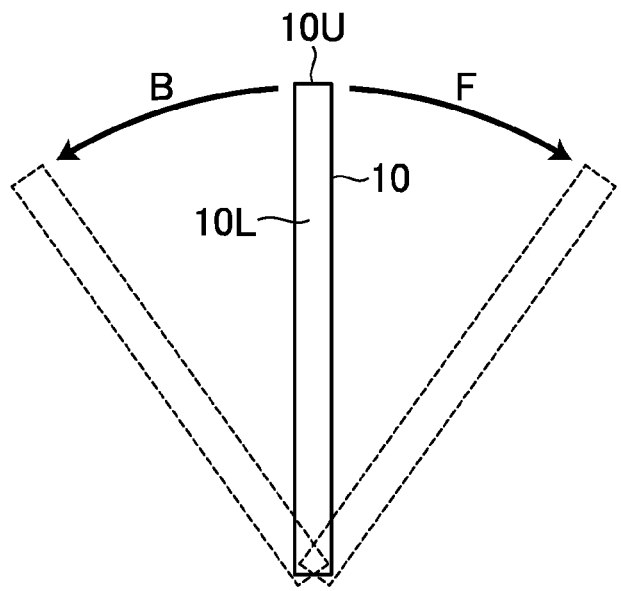
FIG. 5 explains one example of a bookmark registration operation.

In the electronic book viewer, a user can register the current page (the page displayed on the screen) as a bookmark. Below, a bookmark registration operation will be described. FIG. 5 explains a bookmark registration operation, showing the portable reproduction device 10 viewed from the left side surface 10L.

While the page turning operation is defined as an operation of inclining the portable reproduction device 10 with the Z axis as a rotation axis, as described above, a bookmark registration operation is defined as an operation of inclining the portable reproduction device 10 with the X axis, orthogonal to the Z axis, as a rotation axis.

In order to register the current page as a bookmark, a user inclines the portable reproduction device 10 for a relatively short period of time (for example, within 0.5 second), as indicated by the arrow F in FIG. 5, for example, so as to come closer to the user. That is, a user performs an operation of inclining the portable reproduction device 10, as indicated by the arrow F in FIG. 5, and instantly returning to its original state within a relatively short period of time. With this operation performed, the current page is registered in bookmark data (bookmark list). Note that when the above described operation is performed with the current page already registered in a bookmark, the current page is deleted from the bookmark data.

Alternatively, the bookmark registration operation may be an operation of inclining the portable reproduction device 10 for a relatively short period of time (for example, within 0.5 second), as indicated by the arrow B shown in FIG. 5, for example, so as to go farther away from the user. That is, it may be arranged such that the current page is registered as a bookmark when a user performs an operation of inclining the portable reproduction device 10 as indicated by the arrow B in FIG. 5 and then instantly returning to its original state within a relatively short period of time.

As described above, in the portable reproduction device 10, a user can designate page turning and bookmark registration by inclining the portable reproduction device 10. As it is possible to incline the portable reproduction device 10, using the hand holding the portable reproduction device 10, it is possible for a user standing in a train or the like and reading an electronic book displayed on the portable reproduction device 10 while hanging on a strap with one hand and holding the portable reproduction device 10 with the other hand to readily designate page turning and bookmark registration.

Although a case has been described in which a user holds the portable reproduction device 10 such that the longitudinal direction thereof corresponds to the up-down direction (hereinafter referred to a "portrait state"), referring to FIGS. 3 to 5, a user may hold the portable reproduction device 10 such that the longitudinal direction thereof corresponds to the horizontal direction (hereinafter referred to as a "landscape state"). When a user changes the manner of holding the portable reproduction device 10, the orientation of a screen is accordingly changed.

Figure 6:
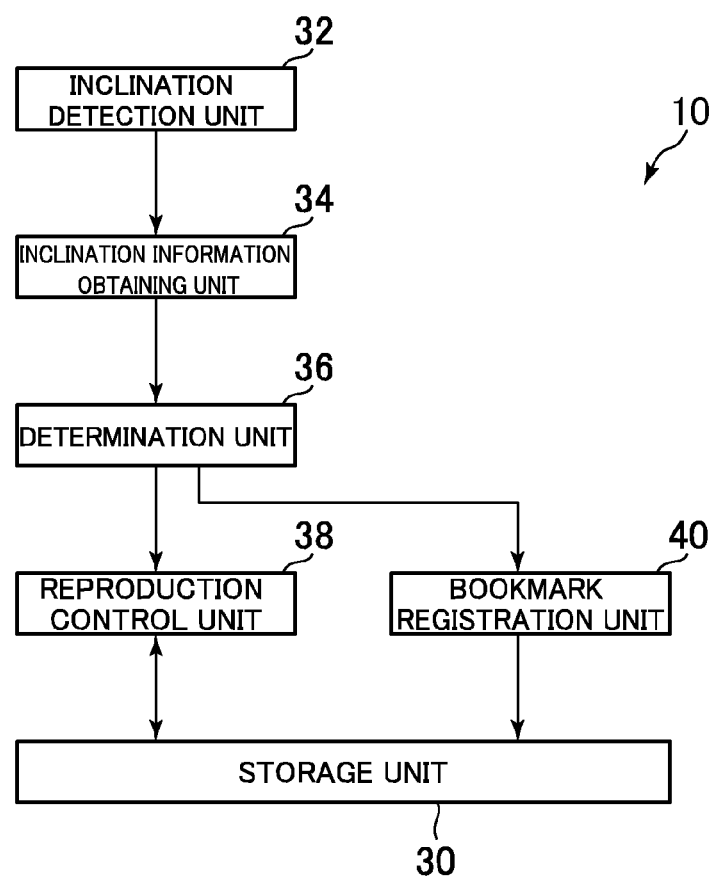
FIG. 6 is a function block diagram of a portable reproduction device according to the embodiment of the present invention.

Below, a structure for achieving the above described user interface will be described. FIG. 6 is a function block diagram showing function blocks relevant to the present invention among those implemented in the portable reproduction device 10 according to this embodiment. As shown in FIG. 6, the portable reproduction device 10 includes a storage unit 30, an inclination detection unit 32, an inclination information obtaining unit 34, a determination unit 36, a reproduction control unit 38, and a bookmark registration unit 40. Note that the bookmark registration unit 40 is not essential, and may be omitted.

For example, the storage unit 30 is the main memory unit 12 and the auxiliary storage unit 13. The inclination detection unit 32 is the posture detection sensor 14. The other function blocks are implemented by the control unit 11. That is, the control unit 11 executes processing according to a program, thereby functioning as the other function blocks.

Initially, the storage unit 30 will be described. Various data is stored in the storage unit 30. For example, various content data is stored in the storage unit 30. While the content data is being reproduced, for example, data indicating a reproduction position of the content data is stored in the storage unit 30.

Further, holding state data, such as is shown in FIG. 7, for example, is stored in the storage unit 30. The holding state data shown in FIG. 7 is data indicating in which of the portrait state and the landscape state a user is holding the portable reproduction device 10. For example, the holding state data takes a value either "0" or "1". The value "0" indicates that a user is holding the portable reproduction device 10 in the portrait state; the value "1" indicates that a user is holding the portable reproduction device 10 in the landscape state. For example, the holding state data is updated by the operating system, based on a result of detection by the posture detection sensor 14.

Further, bookmark data, such as is shown in FIG. 8, for example, is stored in the storage unit 30. The bookmark data shown in FIG. 8 includes an "ID" field and a "bookmark" field. In the "ID" field, identification information (ID) for uniquely identifying the content data is registered. In the "bookmark" field, information indicating a position that is set as a bookmark (in other words, a reproduction position when bookmark registration operation is performed) is registered. When the content data is an electronic book, for example, the page number is registered in the "bookmark" field.

The inclination detection unit 32 and the inclination information obtaining unit 34 will be described. The inclination detection unit 38 32 detects the inclination of the portable reproduction device 10. As described above, the posture detection sensor 14 corresponds to the inclination detection unit 32 in this embodiment. The inclination information obtaining unit 34 obtains inclination information concerning inclination of the portable reproduction device 10 from the inclination detection unit 32.

Below, the determination unit 36, the reproduction control unit 38, and the bookmark registration unit 40 will be described.

When the inclination state of the portable reproduction device 10 detected by the inclination detection unit 32 is changed from a "reference state" to "another state in which the difference from the reference state in inclination is equal to or larger than a reference value (a first reference value)" and then returns from "another state" to the "reference state", the determination unit 36 determines whether or not the period of time (t1) elapsed after the inclination state of the portable reproduction device 10 starts changing from the reference state to another state until the inclination state returns to the "reference state" is within a reference period of time (T1).

Note here that the "reference state" refers to an inclination state of the portable reproduction device 10 at a certain point of time (a reference point of time), for example. The "reference point of time" refers to a point of time at which the portable reproduction device 10 is switched on, an application program for reproducing content data (for example, an electronic book viewer) is activated, or a touch panel is touched by a user. Alternatively, when inclination (posture) of the portable reproduction device 10 is kept unchanged for a predetermined period of time, the state at that time may be set as the "reference state". In this case, when a situation in which variation in inclination of the portable reproduction device 10 remains within a predetermined range continues for a predetermined period of time, it may be considered that the inclination of the portable reproduction device 10 is kept unchanged for a predetermined period of time.

"Another state" refers to a state in which the difference from the reference state is relatively large, being, for example, a state in which the degree of inclination of the portable reproduction device 10 relative to the reference state is equal to or larger than a first reference value.

The "reference period of time (T1)" is a period of time that is set to determine whether or not the above described period of time elapsed (t1) is short. Therefore, the "reference period of time (T1)" is set to a relatively short period of time (for example, 0.5 second).

The determination unit 36 considers that the inclination state of the portable reproduction device 10 has returned to the reference state when the inclination state of the portable electronic device 10 has returned to a state in which the difference from the reference state in inclination is equal to or smaller than a second reference value (a reference value smaller than the first reference value). The portable reproduction device 10 determines in the manner described above because it is difficult for a user to change the inclination state of the portable electronic device 10 from the reference state to another state and then return to a state exactly the same as the reference state.

When the determination unit 36 determines that the above mentioned elapsed period of time (t1) is within the reference period of time (T1), the reproduction control unit 38 changes (advances or regresses) the reproduction position of the content data, based on the "inclination direction relative to the reference state" of the portable reproduction device 10 in the other state mentioned above.

Below, meaning of "changing (advancing or regressing) a reproduction position of content data" will be described.

In a case of content data that is an electronic book, for example, a page displayed on the screen (a display target page) corresponds to "a reproduction position". Changing the display target page to a page following the current display target page corresponds to "advancing a reproduction position". That is, changing a page displayed on the screen to a page immediately following the page currently displayed on the screen corresponds to "advancing a reproduction position". Meanwhile, changing the display target page to a page before the current display target page corresponds to "regressing a reproduction position". That is, changing a page displayed on the screen to a page before the currently displayed page on the screen corresponds to "regressing a reproduction position". Note that keeping turning over the pages toward the last page corresponds to "advancing a reproduction position", and keeping turning over the pages toward the initial page corresponds to "regressing a reproduction position".

Further, in a case of content data that is music data, for example, forwarding corresponds to "advancing a reproduction position", and rewinding corresponds to "regressing a reproduction position". When a plurality of music data (a plurality of unit content data) are reproduced according to order information and these plurality of music data can be considered as one content data, skip to music data following the currently reproduced music data corresponds to "advancing a reproduction position". That is, changing the reproduction target music data to music data following the current reproduction target music data corresponds to "advancing a reproduction position". Meanwhile, skip to music data before the currently reproduced music data corresponds to "regressing a reproduction position". That is, changing the reproduction target music data to music data before the current reproduction target music data corresponds to "regressing a reproduction position".

Still further, in a case of content data that is video data, for example, forwarding corresponds to "advancing a reproduction position", and rewinding corresponds to "regressing a reproduction position". When video data includes a plurality of chapter data (a plurality of unit content data) and the plurality of chapter data are reproduced according to order information, skip to chapter data following the currently reproduced chapter data corresponds to "advancing a reproduction position". That is, changing the reproduction target chapter data to chapter data following the current reproduction target chapter data corresponds to "advancing a reproduction position". Meanwhile, skip to chapter data before the currently reproduced chapter data corresponds to "regressing a reproduction position". That is, changing the reproduction target chapter data to chapter data before the current reproduction target chapter data corresponds to "regressing a reproduction position".

Yet further, for example, when a plurality of image data (a plurality of unit content data) are shown according to order information, and these plurality of image data can be considered as one content data, the image data displayed on a screen corresponds to a "reproduction position". Further, changing the display target image data to image data following the current display target image data corresponds to "advancing a reproduction position". That is, changing the image data displayed on a screen to image data following the image data currently displayed on the screen corresponds to "advancing a reproduction position". Meanwhile, changing the display target image data to image data before the current display target image data corresponds to "regressing a reproduction position". That is, changing the image data displayed on a screen to image data before the image data currently displayed on the screen corresponds to "regressing a reproduction data".

When the determination unit 36 determines that the above described period of time elapsed (t1) is within the reference period of time (T1), the bookmark registration unit 40 registers information indicating the current reproduction position of content data in bookmark data, based on the "inclination direction relative to the reference state" of the portable reproduction device 10 in the other state mentioned above.

FIG. 9 shows one example of data indicating a correlation relationship between an inclination direction of the portable reproduction device 10 and control content by the reproduction control unit 38 or the bookmark registration unit 40 (hereinafter referred to as "correlation relationship data"). According to the correlation relationship data shown in FIG. 9, a correlation relationship between an inclination direction of the portable reproduction device 10 and control content by the reproduction control unit 38 or the bookmark registration unit 40 is defined with respect to each of the holding states (portrait state or landscape state) of the portable reproduction device 10.

According to the correlation relationship data shown in FIG. 9, when the portable reproduction device 10 is held in the portrait state, inclination in the positive direction of the γ direction is correlated to control content "advancing to the next page". "Inclination in the positive direction of the γ direction" refers to inclination in the clockwise direction (for example, the arrow R in FIG. 4) with the Z axis as a rotation axis. Further, according to the correlation relationship data shown in FIG. 9, inclination in the negative direction of the γ direction is correlated to control content "regressing to a previous page". "Inclination in the negative direction of the γ direction" refers to inclination in the counter-clockwise direction (for example, the arrow L in FIG. 4) with the Z axis as a rotation axis.

According to the correlation relationship data shown in FIG. 9, when the portable reproduction device 10 is held in the landscape state, inclination in the positive direction of the α direction is correlated to control content "advancing to the next page". "Inclination in the positive direction of the α direction" refers to inclination in the clockwise direction with the X axis as a rotation axis. Further, according to the correlation relationship data shown in FIG. 9, inclination in the negative direction of the α direction is correlated to control content "regressing to a previous page". "Inclination in the negative direction of the α direction" refers to inclination in the counter-clockwise direction with the X axis as a rotation axis.

According to the correlation relationship data shown in FIG. 9, when the portable reproduction device 10 is held in the portrait state, inclination in the positive direction of the α direction is correlated to control content "registering the current page in bookmark data (deleting the current page from bookmark data)". As described above, "inclination in the positive direction of the α direction" refers to inclination in the clockwise direction (for example, the arrow F in FIG. 5) with the X axis as a rotation axis. Further, according to the correlation relationship data shown in FIG. 9, when the portable reproduction device 10 is held in the landscape state, inclination in the positive direction of the γ direction is correlated to control content "registering the current page in bookmark data (deleting the current page from bookmark data)". As described above, "inclination in the positive direction of the γ direction" refers to inclination in the clockwise direction with the Z axis as a rotation axis.

Note that a correlation relationship between an inclination direction of the portable reproduction device 10 and control content by the reproduction control unit 38 or the bookmark registration unit 40 is not limited to the example shown in FIG. 9. For example, inclination in the β direction may be correlated to page turning processing.

When the determination unit 36 determines that the above described period of time elapsed (t1) is within the reference period of time (T1), the reproduction control unit 38 and the bookmark registration unit 40 control according to the control content data shown in FIG. 9, with details thereof to be described later (see step S112 in FIG. 12).

When the inclination state of the portable reproduction device 10, detected by the inclination detection unit 32, is changed from the reference state to the other state mentioned above (the state in which the difference from the reference state in inclination is equal to or larger than the first reference value), the determination unit 36 (the second determination unit) determines whether or not the period of time elapsed (t2) while the inclination state of the portable reproduction device 10 is changing from the reference state to the other state mentioned above is within the reference period of time (T2).

Note here that the "reference period of time (T2)" refers to a period of time that is set to determine whether or not the above described period of time elapsed (t2) is short. Thus, the "reference period of time (T2)" is set to a relatively short period of time (for example, 0.3 second).

During a period after the determination unit 36 determines that the above described period of time elapsed (t2) is within the reference period of time (T2), the reproduction control unit 38 changes the reproduction position of content data, based on the "inclination direction relative to the reference state" of the portable reproduction device 10 at a current time.

Further, during a period after the determination unit 36 determines that the above described period of time elapsed (t2) is within the reference period of time (T2), the reproduction control unit 38 changes the reproduction position of content data at a speed correlated to the current "inclination degree relative to the reference state" of the portable reproduction device 10.

FIG. 10 shows one example of data (correlation relationship data) indicating a correlation relationship between an inclination direction of the portable reproduction device 10 and control content by the reproduction control unit 38 in this case. According to the correlation relationship data shown in FIG. 10, a correlation relationship between an inclination direction of the portable reproduction device 10 and control content by the reproduction control unit 38 is defined with respect to each of the holding states (portrait state or landscape state) of the portable reproduction device 10.

According to the correlation relationship data shown in FIG. 10, when the portable reproduction device 10 is held in the portrait state, inclination in the positive direction of the γ direction is correlated to control content "turning over the pages toward the last page". Further, inclination in the negative direction of the γ direction is correlated to control content "turning over the pages toward the initial page".

According to the correlation relationship data shown in FIG. 10, when the portable reproduction device 10 is held in the landscape state, inclination in the positive direction of the α direction is correlated to control content "turning over the pages toward the last page". Further, inclination in the negative direction of the α direction is correlated to control content "turning over the pages toward the initial page".

Note that a correlation relationship between an inclination direction of the portable reproduction device 10 and control content by the reproduction control unit 38 is not limited to the example shown in FIG. 10. For example, inclination in the β direction may be correlated to page turning processing.

FIG. 11 shows one example of data for controlling a speed for changing the reproduction position of content data (hereinafter referred to "speed data"). According to the speed data shown in FIG. 11, an inclination degree of the portable reproduction device 10 is correlated to speed information on a speed for changing the reproduction position of content data. Speed data is defined such that a larger inclination degree of the portable reproduction device leads to a faster speed in advancing or regressing the reproduction position of content data.

Note that "θ" in FIG. 11 refers to the degree of current inclination of the portable reproduction device 10 relative to the reference state.

The "speed information" in FIG. 11 is set as to be described below. For example, in turning over a given number of pages at a predetermined time interval, information indicating the "number of pages" mentioned above is set as the "speed information". In this case, a larger inclination degree of the portable reproduction device 10 leads to a larger "number of pages" mentioned above. Further, for example, in turning over a predetermined number of pages at a given time interval, information indicating the "time interval" mentioned above is set as the "speed information". In this case, a larger inclination degree of the portable reproduction device 10 leads to a shorter "time interval" mentioned above.

During a period after the determination unit 36 determines that the above mentioned period of time (t2) is within the reference period of time (T2), the reproduction control unit 38 executes the page turning processing, based on the control content data shown in FIG. 10 and the speed data shown in FIG. 11. In this case, the page turning processing is continued until the inclination state of the portable reproduction device 10 returns to the reference state, with details thereof to be described later (see steps S109 and S110 in FIG. 12).

Below, processing that is executed by the portable reproduction device 10 in order to implement the above described function blocks will be described.

Figure 12:
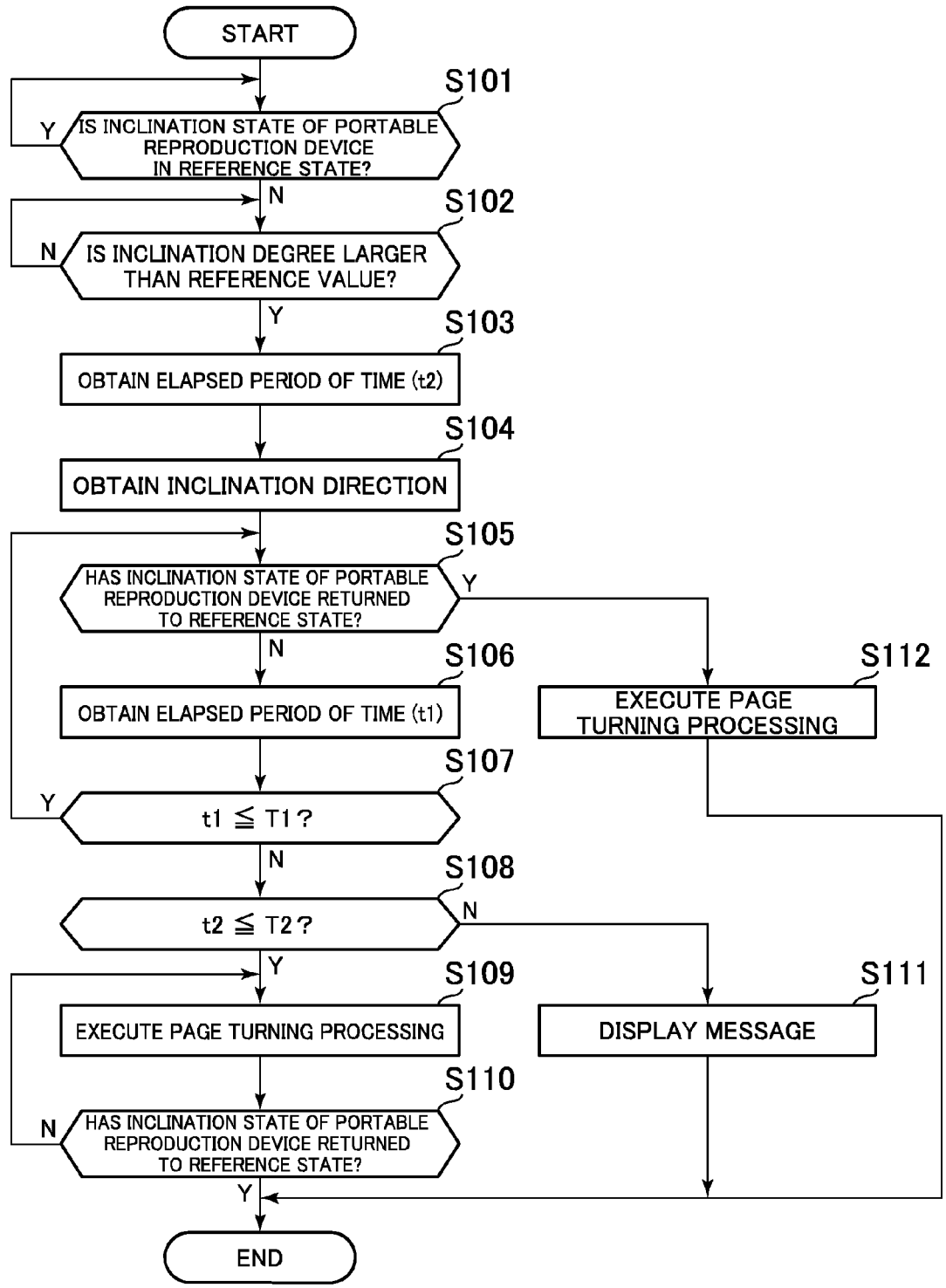
FIG. 12 is a flowchart showing one example of processing executed in an information processing device.

FIG. 12 is a flowchart showing one example of the page turning processing. The page turning processing shown in FIG. 12 begins when the inclination state of the portable reproduction device 10 is in the reference state. The control unit 11 executes the page turning processing shown in FIG. 12 according to a program, thereby functioning as the inclination information obtaining unit 34, the determination unit 36, and the reproduction control unit 38.

In the portable reproduction device 10, history data on the results of detection by a gyro sensor is stored in the main memory unit 12 (or the auxiliary storage unit 13). The control unit 11 integrates the angular speed for every axis to determine by what degree the portable reproduction device 10 is currently inclined relative to the reference state in the respective directions (the α direction, the β direction, and the γ direction). As a method for determining the inclination state of the portable reproduction device 10 based on a result of detection by the gyro sensor, a publicly known method can be used.

As shown in FIG. 12, the control unit 11 determines whether or not the inclination state of the portable reproduction device 10 is in the reference state (S101). That is, the control unit 11 determines whether or not the degree (θ) of current inclination of the portable reproduction device 10 relative to the reference state is equal to or smaller than a reference value (θa: a second reference value). Note that, for example, when the portable reproduction device 10 is held in the portrait state, as page turning processing is correlated to inclination in the γ direction (see FIGS. 9, 10), the degree of inclination in the γ direction is used as the inclination degree (θ). Further, for example, when the portable reproduction device 10 is held in the landscape state, as page turning processing is correlated to inclination in the α direction (see FIGS. 9, 10), the degree of inclination in the α direction is used as the inclination degree (θ). This is similarly applied to subsequent steps. When the inclination degree (θ) is equal to or smaller than the reference value (θa) at step S101, the control unit 11 considers that the inclination state of the portable reproduction device 10 is in the reference state.

When it is determined that the inclination state of the portable reproduction device 10 is in the reference state, the control unit 11 continues monitoring whether or not the inclination state of the portable reproduction device 10 remains in the reference state. Meanwhile, when it is determined that the inclination state of the portable reproduction device 10 is no longer in the reference state (that is, when the inclination state of the portable reproduction device 10 is changed from the reference state), the control unit 11 starts monitoring whether or not the degree (θ) of current inclination of the portable reproduction device 10 relative to the reference state is larger than a reference value (θb: a first reference value) (S102). Note that the reference value (θb) is a value larger than the above described reference value (θa).

When it is determined that the inclination degree (θ) is larger than the reference value (θb), the control unit 11 obtains the period of time (t2) elapsed after the determination is made at step S101 that the inclination state of the portable reproduction device 10 is no longer in the reference state until the determination is made at step S102 that the inclination degree (θ) becomes larger than the reference value (θb) (S103).

Further, the control unit 11 obtains the current inclination direction of the portable reproduction device 10 relative to the reference state (S104). For example, as the page turning processing is correlated to inclination in the γ direction when the portable reproduction device 10 is held in the portrait state (see FIG. 9), the control unit 11 determines whether the inclination direction is in the positive direction or the negative direction of the γ direction. Meanwhile, as the page turning processing is correlated to inclination in the α direction when the portable reproduction device 10 is held in the landscape state (see FIG. 9), the control unit 11 determines whether the inclination direction is in the positive direction or the negative direction of the α direction in this case.

Thereafter, the control unit 11 starts monitoring whether or not the inclination state of the portable reproduction device 10 has returned to the reference state (S105). That is, the control unit 11 monitors whether or not the degree (θ) of current inclination of the portable reproduction device 10 relative to the reference state has returned to be equal to or smaller than the reference value (θa).

When it is determined that the inclination state of the portable reproduction device 10 has not returned to the reference state, the control unit 11 obtains the period of time elapsed (t1) after the determination is made at step S101 that the inclination state of the portable reproduction device 10 is no longer in the reference state (S106). Then, the control unit 11 (the determination unit 36) determines whether or not the period of time elapsed (t1) is within a reference period of time (T1: for example, 0.5 second) (S107). When it is determined that the period of time elapsed (t1) is within the reference period of time (T1), the control unit 11 continues monitoring whether or not the inclination state of the portable reproduction device 10 has returned to the reference state.

When it is determined at step S105 that the inclination state of the portable reproduction device 10 has returned to the reference state, the control unit 11 (the reproduction control unit 38) executes the page turning processing (S112). For example, when the portable reproduction device 10 is held in the portrait state and the inclination direction obtained at step S104 is in the positive direction of the γ direction, the control unit 11 updates the page displayed on the screen to the next page (see FIG. 9). Meanwhile, for example, when the portable reproduction device 10 is held in the portrait state and the inclination direction obtained at step S104 is in the negative direction of the γ direction, the control unit 11 updates the page displayed on the screen to the previous page (see FIG. 9).

Note that when it is determined at step S107 that the period of time elapsed (t1) is not within the reference period of time (T1), the control unit 11 (the determination unit 36) determines whether or not the period of time elapsed (t2) obtained at step S103 is within the reference period of time (T2: for example, 0.3 second) (S108).

When it is determined that the period of time elapsed (t2) is within the reference period of time (T2), the control unit 11 (the reproduction control unit 38) executes the page turning processing (S109).

In this case, the control unit 11 obtains the current inclination direction and the current inclination degree of the portable reproduction device 10 relative to the reference state. As described above, when the portable reproduction device 10 is held in the portrait state, as the page turning processing is correlated to inclination in the γ direction (see FIG. 10), the control unit 11 determines whether the inclination direction is in the positive direction or the negative direction of the γ direction, and obtains the inclination degree in the γ direction. Meanwhile, when the portable reproduction device 10 is held in the landscape state, as the page turning processing is correlated to inclination in the α direction (see FIG. 10), the control unit 11 determines whether the inclination direction is in the positive direction or the negative direction of the α direction, and obtains the inclination degree in the α direction.

Then, the control unit 11 obtains the page turning direction, based on the inclination direction of the portable reproduction device 10 and the correlation relationship data (FIG. 10). For example, when the portable reproduction device 10 is held in the portrait state and the inclination direction of the portable reproduction device 10 is in the positive direction of the γ direction, the control unit 11 obtains the direction toward the last page as the page turning direction. Meanwhile, for example, when the portable reproduction device 10 is held in the portrait state and the inclination direction of the portable reproduction device 10 is in the negative direction of the γ direction, the control unit 11 obtains the direction toward the initial page as the page turning direction.

Further, the control unit 11 determines a speed for turning over the pages, based on the inclination degree of the portable reproduction device 10 and the speed data (FIG. 11). For example, the control unit 11 obtains the speed information correlated to the inclination degree of the portable reproduction device 10. For example, when the portable reproduction device 10 is held in the portrait state, the control unit 11 obtains the speed information correlated to the degree of inclination in the γ direction. Meanwhile, for example, when the portable reproduction device 10 is held in the landscape state, the control unit 11 obtains the speed information correlated to the degree of inclination in the α direction.

Then, the control unit 11 updates the page displayed on the screen in the page turning direction obtained as described above at the speed indicated by the speed information obtained as described above.

The control unit 11 repetitively executes the processing at step S109 until the inclination state of the portable reproduction device 10 returns to the reference state. That is, after execution of the processing at step S109, the control unit 11 determines whether or not the inclination state of the portable reproduction device 10 has returned to the reference state (S110). The processing at step S110 is similar to that at step S105.

When it is determined that the inclination state of the portable reproduction device 10 has not returned to the reference state, the control unit 11 executes again the processing at step S109. Meanwhile, when it is determined that the inclination state of the portable reproduction device 10 has returned to the reference state, this processing is ended. In this case, the processing at step S101 is executed again.

Note that a case without a determination at step S108 that the above described period of time elapsed (t2) is within the reference period of time (T2) refers to a case in which a user does not incline the portable reproduction device 10 instantly.

In this case, for example, the control unit 11 shows a message in the screen for requesting a user to return the portable reproduction device 10 to the reference state (S111). Note that, in this case, an image showing the reference state may be displayed in the screen together with the message so that a user can recognize the reference state.

Alternatively, instead of displaying the above described message, the reference state of the portable reproduction device 10 may be reset. For example, when the inclination state of the portable reproduction device 10 remains not changed for a predetermined period of time, the control unit 11 may set the inclination state of the portable reproduction device 10 at that time as a new reference state. With the above, the description on the processing shown in FIG. 12 is completed.

Figure 13:
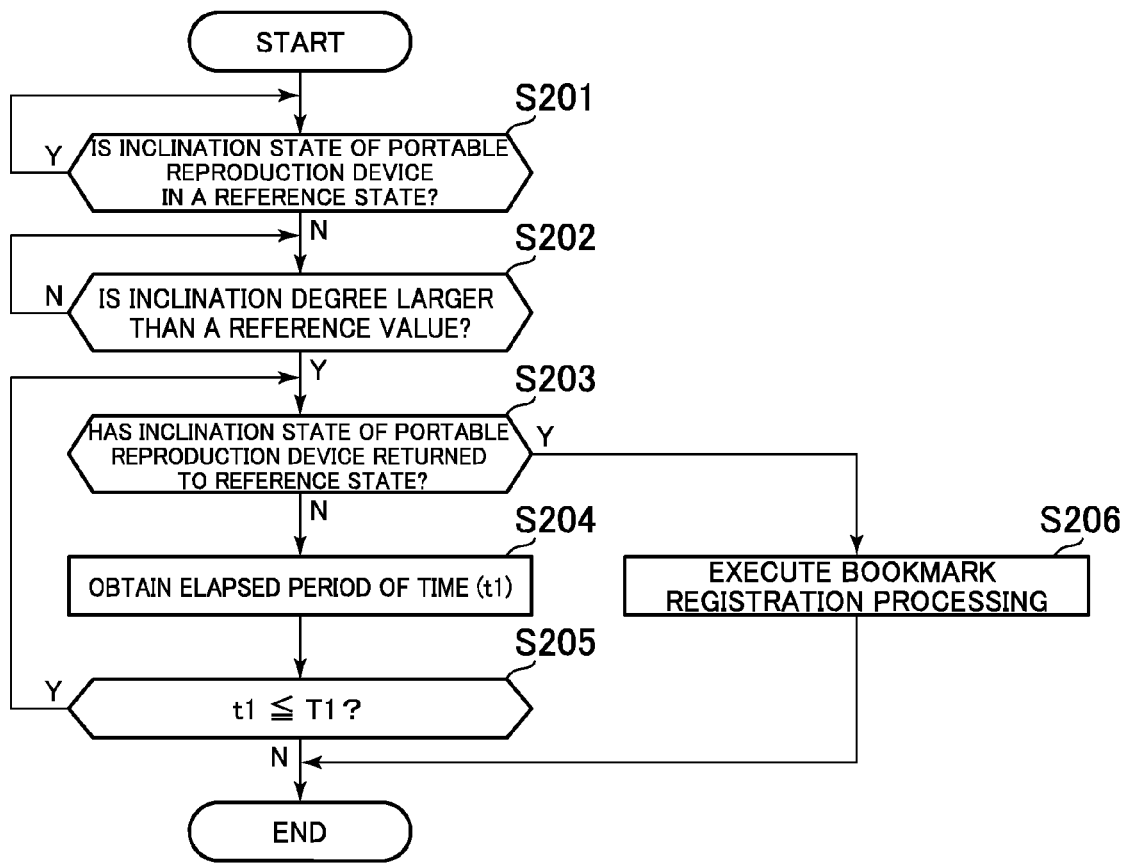
FIG. 13 is a flowchart showing one example of processing executed in the information processing device.

FIG. 13 is a flowchart showing one example of the bookmark registration processing. Similar to the processing shown in FIG. 12, the bookmark registration processing shown in FIG. 13 as well begins when the inclination state of the portable reproduction device 10 is in the reference state. The control unit 11 executes the bookmark registration processing shown in FIG. 13 according to a program, thereby functioning as the inclination information obtaining unit 34, the determination unit 36, and the bookmark registration unit 40.

As shown in FIG. 13, the control unit 11 determines whether or not the inclination state of the portable reproduction device 10 is in the reference state (S201). This processing is similar to that at step S101 in FIG. 12. However, the bookmark registration processing is correlated to inclination in the α direction (positive direction) when the portable reproduction device 10 is held by a user in the portrait state, and to the γ direction (positive direction) when the portable reproduction device 10 is held by a user in the landscape state. Thus, when a user holds the portable reproduction device 10 in the portrait state, the degree of inclination in the α direction (positive direction) is used as the inclination degree (θ), while, when a user holds the portable reproduction device 10 in the landscape state, the degree of inclination in the γ direction (positive direction) is used as the inclination degree (θ). This is similarly applied to the subsequent steps.

When it is determined that the inclination state of the portable reproduction device 10 is in the reference state, the control unit 11 continues monitoring whether or not the inclination state of the portable reproduction device 10 remains in the reference state. Meanwhile, when it is determined that the inclination state of the portable reproduction device 10 is no longer in the reference state (that is, a case in which the inclination state of the portable reproduction device 10 is changed from the reference state), the control unit 11 starts monitoring whether or not the current inclination degree (θ) of the portable reproduction device 10 relative to the reference state has become larger than the reference value (θb) (S202). This processing is similar to that at step S102 in FIG. 12.

After the determination that the inclination degree (θ) has become larger than the reference value (θb), the control unit 11 starts monitoring whether or not the inclination state of the portable reproduction device 10 has returned to the reference state (S203). This processing is similar to that at step S105 in FIG. 12.

When it is determined that the inclination state of the portable reproduction device 10 has not returned to the reference state, the control unit 11 obtains the period of time elapsed (t1) after the determination is made at step S201 that the inclination state of the portable reproduction device 10 is no longer in the reference state (S204). Then, the control unit 11 (the determination unit 36) determines whether or not the period of time elapsed (t1) is within the reference period of time (T1: for example, 0.5 second) (S205). The processing is similar to that at steps S106 and S107 in FIG. 12. When it is determined that the period of time elapsed (t1) is within the reference period of time (T1), the control unit 11 continues monitoring whether or not the inclination state of the portable reproduction device 10 has returned to the reference state.

When it is determined at step S203 that the inclination state of the portable reproduction device 10 has returned to the reference state, the control unit 11 (the bookmark registration unit 40) executes the book registration processing (S206). For example, the control unit 11 determines whether or not the current page (the page displayed on the screen) is registered in bookmark data. That is, the control unit 11 determines whether or not a combination of the ID of the electronic book displayed and the current page is registered in bookmark data. When the current page is not registered in bookmark data, the control unit 11 registers the combination of the ID of the electronic book displayed and the current page in bookmark data. Meanwhile, when the current page is registered in bookmark data, the control unit 11 deletes the combination of the ID of the electronic book displayed and the current page from the bookmark data.

Note than when it is determined at step S205 that the period of time elapsed (t1) is not within the reference period of time (T1), this processing is ended. With the above, the description on the processing shown in FIG. 13 is completed.

According to the portable reproduction device 10 described above, a user can designate page turning and bookmark registration by inclining the portable reproduction device 10 for a relatively short period of time (for example, within 0.5 second). It is possible to incline the portable reproduction device 10, using the hand holding the portable reproduction device 10. Therefore, even when a user is standing in a train or the like and reading an electronic book displayed in the portable reproduction device 10, while hanging on a strap with one hand and holding the portable reproduction device 10 with the other hand, the user can readily designate page turning and bookmark registration.

Further, according to the portable reproduction device 10, a user can adjust a speed for turning over the pages by adjusting the inclination degree (an extent) of the portable reproduction device 10.

Note that the present invention is not limited to the above described embodiment.

[1] For example, when the determination unit 36 determines that the period of time elapsed (t1) after the inclination state of the portable reproduction device 10 starts changing from the reference state to another state until the inclination state of the portable reproduction device 10 returns to the reference state is within the reference period of time (T1), the reproduction control unit 38 may set an amount by which to change the reproduction position of the content data when changing the reproduction position of the content data, based on the degree of inclination of the portable reproduction device 10 in the other state mentioned above relative to the reference state.

At step S112, for example, the control unit 11 may change the amount by which to turn over the pages.

In this case, the control unit 11 obtains the inclination degree at a point of time at which the inclination relative to the reference state is largest. For example, as the page turning processing is correlated to inclination in the γ direction when the portable reproduction device 10 is held in the portrait state (see FIG. 9), the control unit 11 obtains the degree of inclination (the degree of inclination in the γ direction) when inclination in the γ direction is largest. Meanwhile, for example, as the page turning processing is correlated to inclination in the α direction when the portable reproduction device 10 is held in the landscape state (see FIG. 9), the control unit 11 obtains the degree of inclination (the degree of inclination in the α direction) when inclination in the α direction is largest. Then, the control unit 11 obtains speed information correlated to the inclination degree obtained as described above, based on the speed data (FIG. 11). In this case, "speed information" in the speed data is information indicating an amount by which to turn over the pages. That is, "speed information" is information indicating the number of pages.

At step S112, the control unit 11 turns over the pages in the page turning direction obtained at the step S112 by the page turning amount (the number of pages) indicated by the speed information obtained at step S112.

[2] Further, for example, the portable reproduction device 10 may have an approach detection unit (for example, an approach sensor) for detecting a user approaching the portable reproduction device 10. Based on a result of detection by the approach detection unit, the portable reproduction device 10 (restricting means) may restrict reproduction control by the reproduction control unit 38 with respect to content data.

For example, when a user approaching the portable reproduction device 10 is not detected, the portable reproduction device 10 allows the reproduction control unit 38 to execute reproduction control with respect to content data. Meanwhile, when a user approaching the portable reproduction device 10 is detected, the portable reproduction device 10 prevents the reproduction control unit 38 from executing reproduction control with respect to content data. With the above, when a user comes to hold the portable reproduction device 10 in their arms as the train or the like rocks, for example, it is possible to avoid page turning or bookmark registration not intended by the user.

[3] Further, although a case has been described in the above in which the inclination state (posture) of the portable reproduction device 10 is determined based mainly on a result of detection by a gyro sensor, the inclination state of the portable reproduction device 10 may be determined based on a result of detection by an acceleration sensor. In this case, as a method for determining the inclination state of the portable reproduction device 10 based on a result of detection by an acceleration sensor, a publicly known method may be used. Note that in a case where a user is in a train or the like, the acceleration sensor may be subjected to influence of acceleration or deceleration of the train or the like, and this may deteriorate accuracy of a result of determination on the inclination state of the portable reproduction device 10. Regarding this point, use of a gyro sensor can avoid such influence.

[4] Further, for example, although a case in which an electronic book is reproduced is mainly described as an example in the above, the present invention can be applied to a case in which other content data is reproduced. For example, application of the present invention facilitates designation of forwarding, rewinding, or skip by a user standing in a train or the like and viewing content data reproduced in the portable reproduction device 10, while hanging on a strap with one hand and holding the portable reproduction device 10 with the other hand.

The invention claimed is:

1. A portable reproduction device for reproducing content data, the portable reproduction device comprising:
   a processor; and
   a memory device that stores a plurality of instructions, which when executed by the processor, causes the processor to:
   detect an inclination state of the portable reproduction device;
   determine if the inclination state of the portable reproduction device is changed from a reference state to another state in which a difference from the reference state in inclination is equal to or larger than a reference value and thereafter returns from the another state to the reference state, whether or not a period of time elapsed after the inclination state of the portable reproduction device starts changing from the reference state to the another state until the inclination state of the portable reproduction device returns to the reference state is within a reference period of time; and
   change a reproduction position of the content data based on a direction of inclination of the portable reproduction device in the another state relative to the reference state, after the inclination state of the portable reproduction device returned to the reference state, if the processor determines that the period of time elapsed is within the reference period of time.

2. The portable reproduction device according to claim 1, wherein the processor is further operable to:
   set an amount by which to change the reproduction position of the content data when changing the reproduction position of the content data, based on an inclination degree of the portable reproduction device in the another state relative to the reference state.

3. The portable reproduction device according to claim 1, wherein the processor is further operable to:
   determine if the inclination state of the portable reproduction device is changed from the reference state to the another state, whether or not the period of time elapsed after the inclination state of the portable reproduction device starts changing from the reference state until the inclination state of the portable reproduction device comes to be in the another state is within a reference period of time, wherein the processor is further operable to:
   change the reproduction position of the content data, based on a current direction of inclination of the portable reproduction device relative to the reference state, during a period after the processor determines that the period of time elapsed is within the reference period of time.

4. The portable reproduction device according to claim 2, wherein the processor is further operable to:
   determine if the inclination state of the portable reproduction device is changed from the reference state to the another state, whether or not the period of time elapsed after the inclination state of the portable reproduction device starts changing from the reference state until the inclination state of the portable reproduction device comes to be in the another state is within a reference period of time, wherein the processor is further operable to:
   change the reproduction position of the content data, based on a current direction of inclination of the portable reproduction device relative to the reference state, during a period after the processor determines that the period of time elapsed is within the reference period of time.

5. The portable reproduction device according to claim 3, wherein
   the reproduction position of the content data is changed at a speed correlated to a current degree of inclination of the portable reproduction device relative to the reference state, during the period after the processor determines that the period of time elapsed is within the reference period of time.

6. The portable reproduction device according to claim 4, wherein
   the reproduction position of the content data is changed at a speed correlated to a current degree of inclination of the portable reproduction device relative to the reference state, during the period after the processor determines that the period of time elapsed is within the reference period of time.

7. The portable reproduction device according to claim 1, wherein the processor is further operable to:
   detect a user approaching the portable reproduction device; and
   restrict reproduction control with respect to the content data, based on a result of detecting the user approaching the portable reproduction device.

8. The portable reproduction device according to claim 2, wherein the processor is further operable to:
   detect a user approaching the portable reproduction device; and
   restrict reproduction control with respect to the content data, based on a result of detecting the user approaching the portable reproduction device.

9. The portable reproduction device according to claim 1, wherein the processor is further operable to:
   change the reproduction position of the content data if the processor determines that the period of time elapsed is within the reference period of time, and the direction of inclination of the portable reproduction device in the another state relative to the reference state is a direction of inclination with a first axis as a rotation axis, and
   the processor is further operable to register information indicating a current reproduction position of the content data in bookmark data stored in a storage if the processor determines that the period of time elapsed is within the reference period of time, and the direction of inclination of the portable reproduction device in the another state relative to the reference state is a direction of inclination with a second axis orthogonal to the first axis as a rotation axis.

10. The portable reproduction device according to claim 2, wherein the processor is further operable to:
    change the reproduction position of the content data if the processor determines that the period of time elapsed is within the reference period of time, and the direction of inclination of the portable reproduction device in the another state relative to the reference state is a direction of inclination with a first axis as a rotation axis, and
    the processor is further operable to register information indicating a current reproduction position of the content data in bookmark data stored in a storage if the processor determines that the period of time elapsed is within the reference period of time, and the direction of inclination of the portable reproduction device in the another state relative to the reference state is a direction of inclination with a second axis orthogonal to the first axis as a rotation axis.

11. The portable reproduction device according to claim 9, wherein the processor is further operable to:
delete the information indicating the current reproduction position of the content data from the bookmark data if the processor determines that the period of time elapsed is within the reference period of time, the direction of inclination of the portable reproduction device in the another state relative to the reference state is a direction of inclination with the second axis as a rotation axis, and the information indicating the current reproduction position of the content data is already registered in the bookmark data.

12. The portable reproduction device according to claim 10, wherein the processor is further operable to:
delete the information indicating the current reproduction position of the content data from the bookmark data if the processor determines that the period of time elapsed is within the reference period of time, the direction of inclination of the portable reproduction device in the another state relative to the reference state is a direction of inclination with the second axis as a rotation axis, and the information indicating the current reproduction position of the content data is already registered in the bookmark data.

13. The portable reproduction device according to claim 1, wherein
the content data includes a plurality of unit content data, the portable reproduction device reproduces the plurality of unit content data according to order information, and
the processor is further operable to change reproduction target unit content data to unit content data following or preceding current reproduction target unit content data, to thereby change the reproduction position of the content data.

14. The portable reproduction device according to claim 2, wherein
the content data includes a plurality of unit content data, the portable reproduction device reproduces the plurality of unit content data according to order information, and
the processor is further operable to change reproduction target unit content data to unit content data following or preceding current reproduction target unit content data, to thereby change the reproduction position of the content data.

15. The portable reproduction device according to claim 1, wherein
the another state is a state in which a difference from the reference state in inclination is equal to or larger than a first reference value, and
the processor is further operable to determine that the inclination state of the portable reproduction device returns to the reference state if the inclination state of the portable reproduction device comes to be in a state in which the difference from the reference state in inclination is equal to or smaller than a second reference value that is smaller than the first reference state.

16. The portable reproduction device according to claim 2, wherein
the another state is a state in which a difference from the reference state in inclination is equal to or larger than a first reference value, and
the processor is further operable to determine that the inclination state of the portable reproduction device returns to the reference state if the inclination state of the portable reproduction device comes to be in a state in which the difference from the reference state in inclination is equal to or smaller than a second reference value that is smaller than the first reference state.

17. A control method for a portable reproduction device for reproducing content data, the portable reproduction device operable to detect an inclination state of the portable reproduction device, the control method comprising:
obtaining information on the inclination state of the portable reproduction device;
determining if the detected inclination state of the portable reproduction device is changed from a reference state to another state in which a difference from the reference state in inclination is equal to or larger than a reference value and thereafter returns from the another state to the reference state, whether or not a period of time elapsed after the inclination state of the portable reproduction device starts changing from the reference state to the another state until the inclination state of the portable reproduction device returns to the reference state is within a reference period of time; and
changing a reproduction position of the content data, based on a direction of inclination of the portable reproduction device in the another state relative to the reference state, after the inclination state of the portable reproduction device returned to the reference state, if it is determined at the determining that the period of time elapsed is within the reference period of time.

* * * * *